Dec. 5, 1967  D. B. CRAWFORD ET AL  3,355,902
HELIUM RECOVERY PROCESS
Filed May 11, 1964  2 Sheets-Sheet 1

INVENTORS
Duffer B. Crawford
BY Maxim Karafian
John C. Quinlan
ATTORNEY
Wayne C. Jaeschke
AGENT

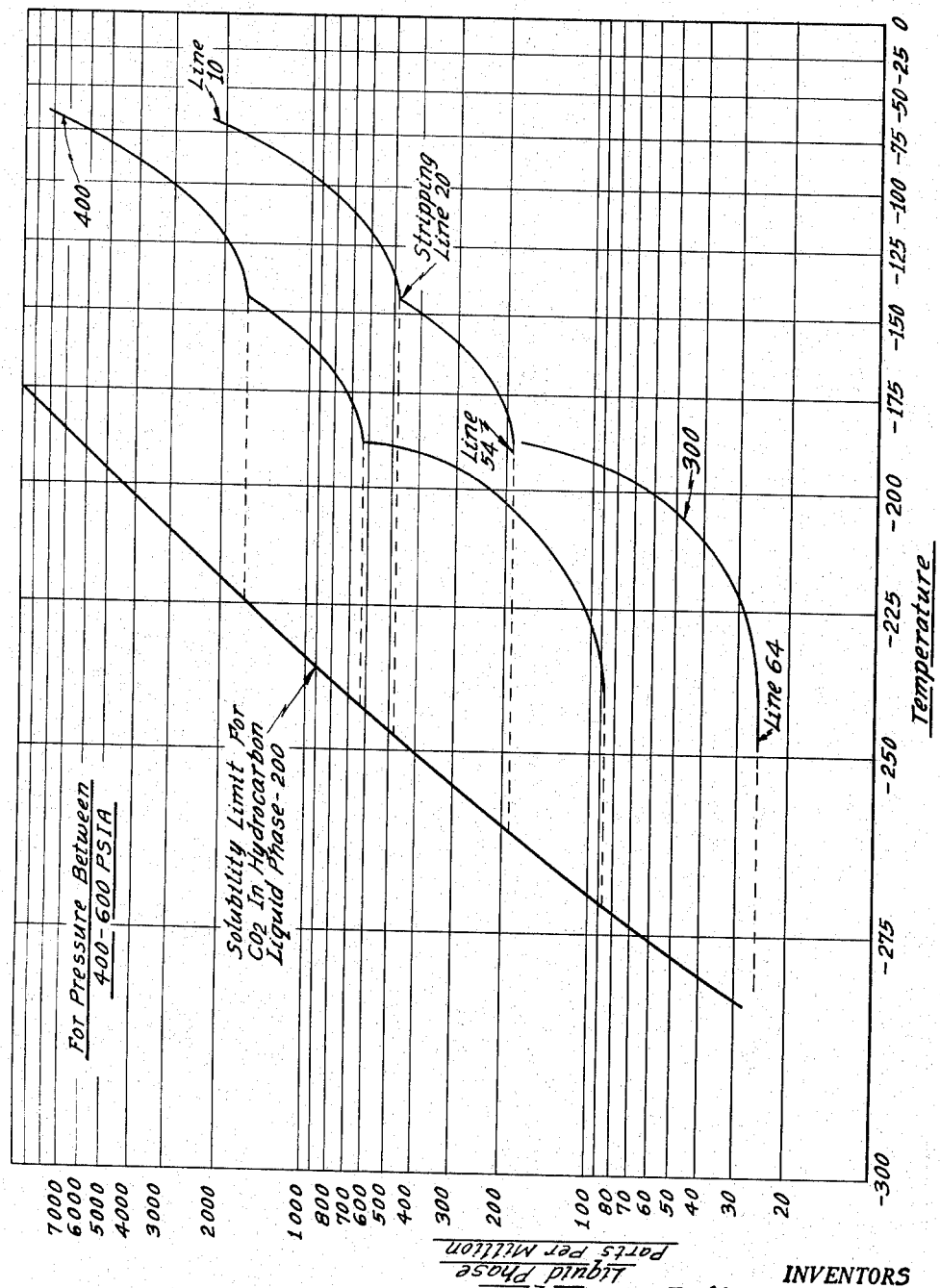

United States Patent Office
3,355,902
Patented Dec. 5, 1967

3,355,902
HELIUM RECOVERY PROCESS
Duffer B. Crawford, Westfield, N.J., and Maxim Karafian, Cold Spring Harbor, N.Y., assignors to Pullman Incorporated, Chicago, Ill., a corporation of Delaware
Filed May 11, 1964, Ser. No. 366,458
16 Claims. (Cl. 62—28)

The present invention relates to the recovery of helium. More specifically, it relates to the recovery of helium from natural gas by liquefaction and, still more specifically, to a more efficient process for the recovery of crude helium from natural gas.

In the past recovery processes, helium was recovered from natural gas mixtures which generally contained less than about one-half of a percent of helium by treating such mixtures to remove carbon dioxide in the so-called warm end of the liquefaction process, and then by cooling the mixture in several stages to remove hydrocarbons and to produce a 60 to 75 percent helium crude. Standard methods of removing carbon dioxide in the warm end of the process include absorption in liquids such as, e.g., monoethanolamine solutions.

In past processes, helium-containing natural gas under a pressure of, e.g., 400–650 p.s.i.a., at ambient temperature, is passed to a gas cleaning step to remove entrained solids, to an absorption tower to remove carbon dioxide, and then to dryers wherein the helium-containing natural gas mixture is desiccated by suitable means. The pretreated helium-containing natural gas which is substantially free of carbon dioxide is cooled to condense and separate heavy hydrocarbons, and then passed to the cold end of the helium recovery process wherein crude helium is separated from the condensed hydrocarbons. One known helium recovery process involves cooling the entire pretreated helium-containing natural gas feedstock to a temperature of about −250° F., passing the gas-liquid mixture thus produced to a separator-rectifier, and recovering helium, nitrogen, and a small quantity of gaseous hydrocarbons overhead of the rectifier from the liquefied hydrocarbons which are separated as bottoms product. Unfortunately, in the past processes, it has been necessary to substantially completely remove carbon dioxide from the natural gas feedstock at a point in the warm end of the process in order to prevent the riming out or precipitation of this material in the conduits and vessels of the cryogenic portion of the recovery process. Much of the prior art in this area is addressed to the problem of effective carbon dioxide removal.

It is, therefore, an object of the present invention to provide a process for the recovery of crude helium from natural gas overcoming and eliminating the inherent disadvantages in the prior art.

Another object of the present invention is to provide an efficient process for the recovery of helium from natural gas by liquefaction of hydrocarbons and separation of gaseous helium.

Another object of the present invention is to provide a process for the recovery of crude helium in the presence of carbon dioxide.

Still another object of the present invention is to provide a process for the recovery of helium by a cryogenic method of improved thermodynamic efficiency.

Another object of the present invention is to provide a novel method of stripping dissolved helium from a mixture containing helium, nitrogen, and methane.

Other objects and advantages of the present invention will become apparent to those skilled in the art from the following detailed description and disclosure.

The objects of the present invention are generally accomplished in accordance with one aspect of the present invention by introducing a feed stream comprising a helium- and carbon dioxide-containing natural gas, which has been pretreated to substantially remove relatively heavy hydrocarbon material, into the crude helium recovery zone of the present invention at an elevated pressure, e.g., 400–650 p.s.i.a., and by cooling the helium-containing feed gas so that a portion of the feed stream is liquefied. The liquid which contains an appreciable amount of dissolved helium is separated from the remaining vapor and passed to a stripping zone which is maintained generally under conditions such that substantially all of the dissolved helium is recovered from the liquid as overhead vapor containing methane, helium, nitrogen, and a small amount of carbon dioxide, and preferably maintained at a temperature between about −125° F. and about −175° F. The remaining vapor and stripper overhead are passed, either as one or as a plurality of streams, to a suitable cooling zone such as, e.g., a methane refrigeration zone, wherein further portions of these vapors are liquefied by cooling to a temperature preferably between about −150° F. and about −250° F., the temperature to which the vapors are cooled being most preferably maintained as low as is thermodynamically practicable while avoiding the precipitation or riming out of carbon dioxide. The solubility of carbon dioxide in hydrocarbon mixtures at various concentrations, temperatures, and pressures must be taken into consideration to ascertain the lowest temperature which can be employed without precipitation of carbon dioxide. A partially liquefied stream is obtained from the cooling step which stream is enriched in helium and yet contains a substantial percentage of methane in the vapor phase and is enriched in carbon dioxide and methane in the liquid phase. A liquid fraction is separated from the vapor phase and passed as the primary feed to a fractionation zone which is generally maintained under conditions which are favorable for stripping substantially all of the helium from the liquid in the stripping section, for effecting the separation of helium from nitrogen and methane into the vapor rising in the rectifier section of the fractionation zone, and for dissolving or absorbing carbon dioxide into the liquid descending in the rectifier. The top of the rectifier is preferably maintained at a temperature between about −200° F. and about −320° F.

The aforementioned favorable conditions are achieved in the rectifier and crude helium-rich gaseous product is obtained with an unexpectedly reduced horsepower requirement by passing at least a portion of the aforementioned helium enriched vapor phase containing a substantial percentage of methane as a fractionator by-pass stream through suitable cooling and separation zones. To separate the helium-rich gaseous product from methane enriched liquid, the methane enriched liquid is employed to provide reflux in the fractionation zone. By carrying out the cooling and separation of the vapor phase which by-passes the fractionator in stages of successively lower temperature, the separation of product vapor from reflux liquid is achieved without carbon dioxide precipitation.

In a preferred embodiment of the above-described aspect of the present invention, the helium enriched vapor phase which is separated from the liquid passed as feed to the fractionator is partially liquefied by further cooling to a temperature preferably between about −200° F. and about −250° F., and most preferably, as low as is thermodynamically practicable within the aforementioned range such that carbon dioxide does not precipitate. A second liquid fraction enriched in methane relative to the vapor from which it is separated and a second vaporous fraction enriched in helium is obtained from the further cooling. The second vaporous fraction is relatively free of carbon dioxide, since the latter remains in the liquid. The second liquid fraction is introduced to the rectifying section of the fractionator at a point which is preferably at about the same temperature as the second liquid fraction. The second liquid fraction can also be introduced to the fractionator at the primary feed point. The vaporous fraction separated from the second liquid fraction is preferably combined with the overhead vapor withdrawn from the rectifier, which is likewise substantially free of carbon dioxide, and cooled to a temperature between about −250° F. and about −320° F. by means of nitrogen refrigeration, for example, in order to produce a helium-rich vaporous fraction and a liquid fraction richer in methane than the vapor and substantially free of carbon dioxide. It is to be understood that the aforementioned vaporous fraction can be separately cooled and separated without departing from the scope of the present invention. The helium-rich vaporous fraction is withdrawn as crude helium product containing, e.g., from about 60 to about 90 percent helium. The liquid which is enriched in methane is passed to an upper portion of the rectifier to provide reflux having a substantial methane concentration. It is apparent that the present invention provides a novel method for fractionating mixtures containing appreciable percentages of carbon dioxide in any cryogenic process without the necessity of preliminary carbon dioxide removal. The substantial methane concentration of the liquid obtained by cooling the separated vapor which by-passes the fractionator also unexpectedly decreases the helium solubility in the liquid such that the separation of helium from the nitrogen and methane in the liquid occurs at a higher temperature than is expected and allows the separation within the rectifier to be completed using a reduced number of stages of contact.

In accordance with another and broader aspect of the present invention, the improvements of the present invention are obtained by introducing liquid separated from a vapor-liquid mixture containing helium, nitrogen, methane, and carbon dioxide into a fractionator as feed thereto maintained at a temperature between about −130° F. and about −320° F. at the top of the rectifier section thereof, cooling the vapor to obtain a second liquid-vapor mixture, passing the liquid as reflux to the rectifier, and withdrawing the vapor as crude helium product.

For a better understanding of the present invention, reference is now had to the figures of the drawing.

FIGURE 3 shows the solubility limit of carbon dioxide in a hydrocarbon liquid in a data plot of carbon dioxide concentration versus temperature.

Figure 1:
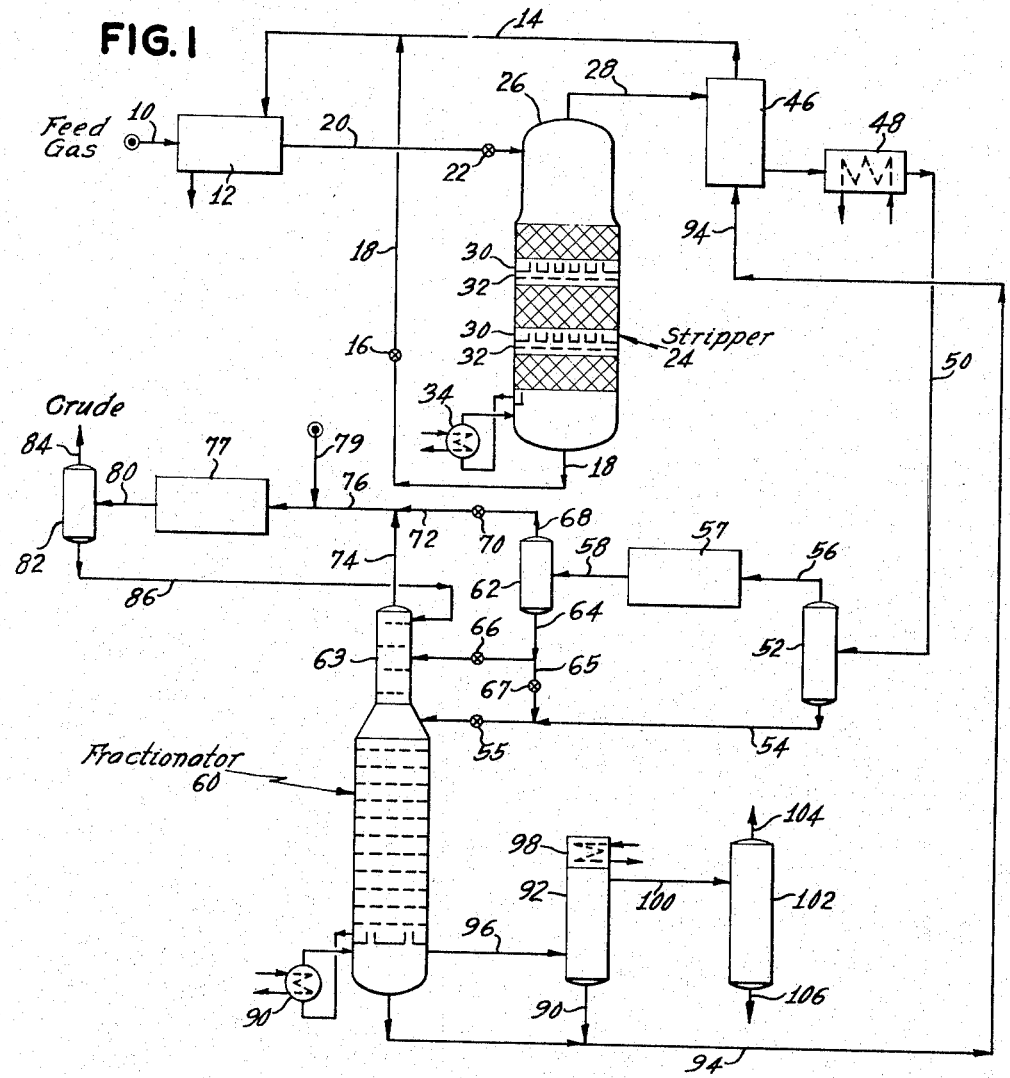
FIGURE 1 shows diagrammatically, in elevation, a preferred embodiment of the process of the present invention.

Referring now to FIGURE 1, described with reference to one example of the operation thereof, a natural gas feed withdrawn from a gas well under an elevated pressure is treated in a suitable hydrocarbon recovery system, not shown in the drawing, in order to produce a helium-containing feed gas in line 10 at a temperature of about −50° F. and a pressure of about 615 p.s.i.a. having the composition shown in Table I, below. It is pointed out that the quantity of carbon dioxide in the feed gas of Table I is substantially the same as that in the natural gas feed as it is withdrawn from the well. No provision is made in the hydrocarbon recovery system to remove carbon dioxide prior to the cryogenic section of the process hereinafter described.

TABLE I
[Composition in line 10 at 615 p.s.i.a. and −50° F.]

| Component: | Moles-per-hour | Mole percent |
|---|---|---|
| He | 383 | 0.45 |
| $CO_2$ | 48 | 0.057 |
| $N_2$ | 10,743 | 12.5 |
| $C_1$ | 67,993 | 79.5 |
| $C_2$ to $C_6$ | 6,447 | 7.5 |
| $H_2$ | 5 | 0.006 |

The feed gas at about −50° F. is cooled to about −150° F. at about 578 p.s.i.a. in heat exchange zone 12 against the combined bottoms products of fractionator 60 in line 14 and of stripper 24 in line 18 thereby producing a mixture of gas and liquid in line 20. The mixture is passed through valve 22 in line 20 into flash zone 26 wherein the vaporous portion of the mixture is separated from liquid, which vaporous portion by-passes stripping zone 24 by means of line 28. The separated liquid which contains dissolved helium passes downwardly through the helium stripper 24. The stripper is divided, in this example, into three sections packed with two-inch pall rings, each section being separated by liquid distribution means 30 and vapor distribution means 32. The vapor distribution means 32 is provided because of the extremely high liquid to vapor volume ratios in the tower, e.g., an $L/V$ about 12/1, and because the density of the vapor rising in the tower actually increases as it flows upwardly from the bottom. The vapor redistribution means provides sufficient pressure drop between packed sections to prevent reversal of the direction of vapor flow up the tower. Vapor is provided by means of reboiler 34 situated at the bottom of the stripping tower. In this example, the bottom of the helium stripper 24 is maintained at about −138° F. and a pressure of about 583 p.s.i.a., and sufficient contact is provided in the stripper such that substantially all of the helium dissolved in the liquid is stripped from the bottoms material removed from the stripper in line 18 having valve 16 situated therein. Overhead vapor withdrawn from the packed sections of the stripper is admixed with the flashed vapor and the mixture is passed in line 28 to further recovery. The composition in line 28 is shown in Table II, below.

TABLE II
[Composition in line 28 at −149° F., 578 p.s.i.a.]

| Component: | Moles-per-hour | Mole percent |
|---|---|---|
| He | 383 | 3.0 |
| $CO_2$ | 2 | 0.015 |
| $N_2$ | 3,831 | 30.1 |
| $C_1$ | 8,398 | 66.1 |
| Other | 93 | 0.73 |

The vapor in line 28 is passed in indirect heat exchange against a portion of the fractionator bottoms product in line 94 in heat exchanger 46 thereby cooling the vapor to a temperature of about −175° F. under a pressure of about 571 p.s.i.a. The resulting vapor-liquid mixture is further cooled to about −187° F. in refrigeration zone 48 to provide a vapor-liquid mixture which is passed in line 50 to separator 52. The compositions of the several streams hereinafter described with reference to the cryogenic separation section or so-called cold end of the process are set out in Table III, below.

TABLE III
[Composition of Streams in Cold End of Process]

| Line Number: | Mole percent | | | P.p.m. |
|---|---|---|---|---|
| | He | $C_1$ | $CO_2$ | |
| 54 | 0.65 | 72 | 0.018 | 190 |
| 56 | 15.5 | 48 | 0.0018 | |
| 64 | 9.91 | 50 | 0.0025 | 26 |
| 68 | 47.5 | 7 | | 4 |
| 74 | 7.3 | 34 | | |
| 84 | 64.5 | 2.4 | | |
| 86 | 1.2 | 3 | | |
| 88 | 0.001 | 70 | 0.016 | 0.9 |

Liquid separated from drum 52 is passed in line 54 through valve 55 as the primary feed to fractionator 60. Vapor separated in line 56 is cooled by flow through methane refrigeration zone 57 to a temperature of about −240° F. under a pressure of about 548 p.s.i.a.; and the resulting vapor-liquid mixture is passed in line 58 to separator 62. Liquid is withdrawn in line 64 and is passed through valve 66 to rectification zone 63, preferably at a point within the zone wherein the temperature of liquid is about equal to the temperature of the liquid in line 64. As an alternative method, the liquid in line 64 can be introduced to the fractionator admixed with the liquid in line 54 by passage through line 65 having valve 67 situated therein. Vapor is withdrawn from separator 62 in line 68, passed through pressure reduction valve 70 in line 72, admixed with tower overhead vapor from line 74, and passed in line 76 through nitrogen refrigeration zone 77 wherein the vapors are cooled to about −275° F. under a pressure of about 478 p.s.i.a. The vapor-liquid mixture produced by such refrigeration is separated in drum 82, and a helium-rich vaporous product is withdrawn in line 84. The concentration of helium in line 84, in this example, is about 64.5 percent, as is indicated in Table III. In an alternative method, the vapors in lines 72 and 74 are separately cooled to the respective temperature levels desired and admixed in line 80. As a further alternative, the vapors in lines 72 and 74 are individually cooled and individually separated, the liquid effluents from the separation being admixed and passed to the rectifier. A liquid, rich in nitrogen, containing an appreciable percentage of methane, and substantially free of carbon dioxide is passed from separator 82 in line 86 to rectifier zone 63 to provide reflux therein. Additional methane can be introduced at a suitable location such as into line 76, for example, by means of line 79 as desired for the purpose of increasing the methane content of the reflux to dissolve solid carbon dioxide which might precipitate in the cold upper regions of the fractionation zone due to upset conditions and to further improve the helium separation. Fractionator 60, in this example, contains a total of 31 trays, four trays being situated in rectifier 63. The fractionator bottom temperature in this case is about −183° F. under a pressure of about 487 p.s.i.a. The fractionator pressure must be controlled to avoid exceeding the critical pressure at this point. Reboiling action is provided by condensing methane in reboiler 90. A tower bottom stream substantially free of helium is withdrawn from fractionator 60 in line 94 and admixed with the bottoms product in line 90 withdrawn from ethane and carbon dioxide rectifier 92. Vapor is withdrawn from fractionator 60 in line 96 and passed to ethane and carbon dioxide rectifier 92, which is provided with methane refrigeration at the top thereof by means of unit 98. A mixture of nitrogen and methane is passed in line 100 to nitrogen-methane fractionator 102 wherein substantially pure nitrogen is recovered overhead in line 104, and methane is recovered, below, in line 106.

Figure 2:
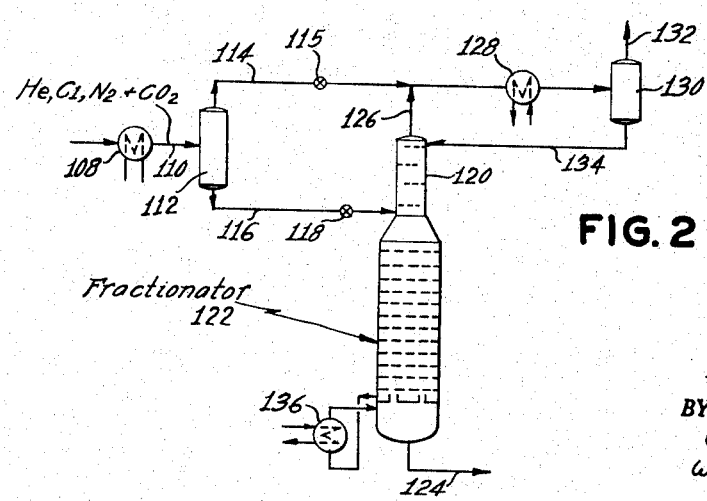
FIGURE 2 shows diagrammatically, in elevation, a process for producing crude helium in accordance with the thermodynamic improvements of the present invention.

FIGURE 2 shows diagrammatically, in elevation, the essential elements of the vapor by-pass aspect of the present invention. It has been discovered that the vapor by-pass permits the recovery of a given quantity of helium of specified purity using less horsepower than is required when helium-containing feed is passed directly to the fractionation zone without employing a vapor by-pass.

A mixture containing essentially helium, methane, nitrogen, a small percentage of carbon dioxide and higher molecular weight hydrocarbons is passed through refrigeration zone 108 in line 110 to produce a vapor-liquid mixture. This mixture is then passed to flash drum 112 to separate a vapor mixture enriched in helium and nitrogen from a liquid mixture enriched in methane which contains substantially all of the carbon dioxide present in the feed. The liquid is then passed in line 116 through valve 118 as feed to the fractionator 122. Helium is separated from the liquid in the stripping section of the fractionator with vapor produced by means of reboiler 136. An essentially helium-free liquid mixture containing nitrogen, methane, higher molecular weight hydrocarbons, and carbon dioxide is withdrawn from the bottom of the fractionator in line 124. The helium-enriched vapor passes upwardly through rectifier section 120 countercurrently to reflux liquid introduced to the rectifier section in line 134. The reflux liquid contains methane and helium and is substantially free of carbon dioxide. A helium-containing stream is withdrawn overhead in line 126, admixed with the vapor stream in line 114 at a point downstream of valve 115. The mixture is passed through refrigeration zone 128 to provide a vapor-liquid mixture which is passed to separation zone 130. A helium-rich product stream is withdrawn overhead of zone 130 in line 132 and a methane enriched liquid is withdrawn below to provide reflux liquid in rectifier section 120.

The improvements described with reference to FIGURE 2 can be employed in the liquefaction of all known natural gas feedstocks containing helium and carbon dioxide without the necessity of special carbon dioxide removal equipment and without building up deposits of carbon dioxide in the fractionating and cooling equipment. Helium-containing streams having carbon dioxide concentrations as high as about 5 mole percent in the feed can be successfully liquefied employing rectifier top temperatures generally between about −130° F. and about −320° F. In accordance with one aspect of the present invention, this arrangement is employed in the relatively low temperature portion of the liquefaction process previously described herein with reference to FIGURE 1, in which case a rectifier top temperature is maintained, preferably between about −200° F. and about −320° F. In another aspect, because of the unexpected horsepower advantage derived from the vapor by-pass, the arrangement illustrated in FIGURE 2 is useful when employed at higher temperatures. For example, under certain circumstances, it is desirable to employ the vapor by-pass arrangement of FIGURE 2 by replacing the stripper shown in FIGURE 1 with a fractionator having a stripping section and a rectifying section, the top of which rectifier is maintained at a temperature between about −130° F. and about −240° F. In all aspects of the present invention, the stripping and fractionation zones are preferably maintained under pressures within the range of about 400 to about 650 p.s.i.a., the pressure within the fractionator being maintained below critical.

Example 1

The following example is presented to illustrate the unexpected decrease in horsepower requirement which results from employing the vapor by-pass arrangement shown in FIGURE 2. Feed in line 110 is introduced at about −130° F. and about 580 p.s.i.g. The feed comprises approximately 41 m.p.h. (moles-per-hour) of helium, 657 m.p.h. of nitrogen, and 6797 m.p.h. of hydrocarbons. In line 116, about 6959 m.p.h. are passed to the fractionator and about 538 m.p.h. of vapor by-pass the fractionator in line 114 for passage through refrigeration zone 128 into separation zone 130. A helium-rich stream is withdrawn from zone 130 at the rate of about 353 m.p.h. in line 132. In this case, separation zone 130 is maintained at about 536 p.s.i.g. and a temperature of about −175° F.

*Example 2*

In a second case presented for purposes of comparison, the entire feed in line 110 is passed directly to the fractionator 122 under the same conditions as described in Example 1, above. A helium-rich stream is withdrawn in line 132 at the same rate, and the same purity as in Example 1. However, when the vapor by-pass is not employed, the temperature of drum 130 is about −186° F. as compared with about −175° F. in the by-pass case. This result, which is not predictable from the prior methods, results in a horsepower savings of about 20–25 percent when the vapor by-pass arrangement is employed. One skilled in the hydrocarbon separation art, might, moreover, predict an opposite result.

The reason for the horsepower advantage derived from by-passing the vapor in line 114 around rectifying section 120 as compared with the known method of feeding the combined vapor-liquid in line 110 to the tower below section 120 is believed to be explained by the property of helium to be more soluble in nitrogen-rich liquid than in methane-rich liquid. The vapor by-pass in line 114 increases the methane concentration in the overhead line 132 and reflux line 134 relative to conventional distillation; this serves to increase the required outlet temperature of refrigerated condenser 128, while at the same time the volatility of helium over the reflux liquid in rectifying section is increased. Because of the more favorable level of refrigeration in condenser 128, the power requirements for the separation effected in the tower decrease by about 20 percent as compared with the conventional case.

FIGURE 3 shows carbon dioxide concentration in liquid hydrocarbon in parts-per-million (p.p.m.) plotted against temperature in degrees Fahrenheit for pressures between about 400 and about 600 p.s.i.a. Line 200 is a data plot of the solubility limit for carbon dioxide in hydrocarbon liquid over a temperature range from about −175° F. to about −280° F. Line 300 is a data plot of carbon dioxide concentration in liquid hydrocarbon versus temperature in degrees Fahrenheit. Describing line 300 with reference to the line numbers of FIGURE 1, the liquid of the feed in line 10 of FIGURE 1 has a carbon dioxide concentration of about 2150 p.p.m. at about −70° F. As the feed is cooled, the carbon dioxide concentration in the liquid decreases to about 500 p.p.m. in line 20 because hydrocarbons continue condensing after the major part of carbon dioxide has been absorbed in the liquid. When the major portion of the feed gas has been condensed, further cooling produces no further decrease in carbon dioxide concentration and if continued carbon dioxide would precipitate at about −248° F. The material in line 20 is stripped at the point indicated in FIGURE 3 and carbon dioxide is removed from the system in line 18 shown in FIGURE 1. The remaining vapor in line 50 is cooled to about 190° F. and the resulting liquid separated in line 54 has a carbon dioxide concentration of about 190 p.p.m. If such material were cooled, carbon dioxide precipitation would occur at about −260° F. The liquid in line 54 is, however, passed as feed to the stripping section of fractionator 60. The liquid in line 64, which is separated after cooling the vapor in line 56 to about −240° F. contains less than 30 p.p.m. carbon dioxide and can be cooled below about −280° F. before carbon dioxide precipitation occurs, is introduced above the primary feed point wherein the liquid in line 54 is introduced in order to absorb any carbon dioxide which is present above the primary feed point. To insure against carbon dioxide precipitation in the coldest upper region of the rectification zone and to improve the separation therein, a methane enriched stream substantially free of carbon dioxide is introduced as reflux to the top of the tower. Line 400 represents a feed in line 10 of FIGURE 1 which contains a substantially greater percentage of carbon dioxide than the feed represented by line 300. This feed is treated in a manner similar to the feed represented by line 300.

It is apparent from this illustration and from a consideration of a feed stream in line 10 which contains an appreciably greater percentage of carbon dioxide, e.g., as shown in line 400, that the method of the present invention for preventing carbon dioxide deposition represents a substantial advance in the art.

Referring again to the operation of packed stripping tower 24 previously described with reference to FIGURE 1, the need for providing vapor distribution plates 32, or like means in the path of upward flow of the vapor is further explained. It has been discovered that when a liquid mixture containing essentially nitrogen, methane, and dissolved helium is passed downwardly over suitable tower packing material in intimate countercurrent contact with upflowing vaporous material, which is produced by reboiling a portion of the liquid material below the tower packing in a bottom part of the stripping tower, and that when conditions are maintained favorable to stripping a substantial percentage of the helium from the liquid mixture into an overhead stream, the density of the vaporous material produced by reboiling the liquid increases to a maximum value as it flows upwardly through the tower packing. This phenomenon may be explained as follows. In the stripping operation the more volatile component of the descending liquid stream (helium in this case) vaporizes and enters the ascending vapor stream; a thermodynamically equivalent amount of the less volatile component (methane in this case) of the vapor phase condenses and enters the liquid stream. In the vast majority of stripping operations the less volatile component of the vapor stream is also the heavier or more dense component; hence as the vapor ascends the tower and more of the less volatile component condenses and leaves the vapor stream the relative concentration of less volatile (denser) component to more volatile (lighter) component decreases and the density of the ascending vapor decreases accordingly. However, in the methane-nitrogen system of the invention, an unusual situation exists in that methane, the less volatile component of the methane-nitrogen vapor, is lighter and therefore less dense than nitrogen. Consequently, as the vapor ascends the tower methane, the less volatile but lighter component of the vapor, decreases in relation to the nitrogen present and the density of the ascending vapor increases accordingly.

Since the descending liquid stream in the tower is essentially completely stripped of its helium content by the time it reaches the bottom of the tower, the helium concentration near the bottom of the tower is so low that it does not materially affect the vapor density in that region. Therefore the density of the ascending vapor in the tower increases as the vapor ascends from the tower bottom and the concentration of nitrogen increases relative to that of methane. However, if the helium content of the liquid being stripped is appreciable, as the vapor ascends the tower still further the helium concentration in the vapor increases until if makes itself felt in lowering the density of the vapor phase. This accounts for the fact that the vapor density attains a maximum value at an intermediate point in the tower and then drops off as the helium concentration in the vapor becomes significant.

The resultant density differential between the relatively low density vapor at the bottom of the tower and the higher density vapor above it in the tower creates a density differential downward driving force since gravity will tend to pull the more dense vapor down through the less dense vapor below it. Thus, in a methane-nitrogen tower, the total downward driving force opposing the ascending vapor has two main components, the head of the down flowing liquid and the abovementioned density differential downward driving force. The vapor upward driving force is of course the pressure drop between the bottom and top of the tower. The effect of the density differential downward driving force is particularly significant by reason of the high liquid flow downwardly in the tower relative to the vapor flow; the density differential driving force often making the difference between an operative tower and operational failure caused by a reversal of vapor flow.

To avoid this problem, vapor distribution means are provided to increase the vapor velocity at or below the critical point where the vector sum of the upward and downward driving forces approaches zero. The increased pressure drop serves to overcome the density differential downward driving force and maintain the vapor flow in an upward direction. The vapor distribution means employed also serves to prevent downward movement of a stagnating "pocket" of vapor through the column.

A better understanding of the unexpected beneficial result obtained by introducing vapor distribution means and thus additional pressure drop to avoid vapor reversal can be obtained by considering the physical situation existing within the tower. A vapor stream is impelled upwards against a descending liquid and the tower packing by the pressure drop driving force between the bottom and the top of the tower. Due to change in composition of the vapor as it ascends, its density increases. Gravity tends to pull the more dense vapor down through the less dense vapor and this density differential downward driving force as well as the liquid head opposes the pressure drop upward driving force. As the competing driving forces approach each other in magnitude, the velocity of the upward flowing vapors decreases and will become zero when the opposing driving forces equal each other. If before this critical juncture is reached vapor distribution means, for example, a baffle plate containing perforations of, for example, one-tenth the cross sectional area of the tower, is placed perpendicular to the direction of vapor flow, the velocity of the upward flowing gases passing through the perforation will increase by tenfold over the velocity in the unbaffled portion of the tower. The high velocity jet thus formed will overcome the "pocket" of vapor approaching stagnation which is prevented by the baffle from descending down through the tower. This unexpected result of introducing vapor distribution means forms the basis of this aspect of applicants' invention. The specific configuration of the vapor distribution means by which the vapor velocity, and hence the pressure drop, is increased is immaterial.

The use of vapor distribution means in packed towers is of course well known in the art. What has been discovered however, is a novel use for vapor distribution means to attain an unexpected beneficial result, i.e., their use in a critical portion of a methane-nitrogen tower to introduce additional pressure drop in a system already threatened with reversal of vapor flow. Contrary to the result which might be expected, the introduction of vapor distribution means at or slightly below the point where stagnation, i.e., zero vapor velocity, would occur will prevent the descent of a stagnant air pocket through the tower and will provide a high velocity jet to overcome the downward density differential driving force.

Many modifications and alterations of the present invention will become apparent to those skilled in the art without departing from the scope of the present invention. For example, the number of separations of liquid from vapor accomplished prior to introducing the feed to the fractionation zone can be increased from two to any desirable number in order to achieve further thermodynamic benefits.

What is claimed is:

1. A method for recovering helium from natural gas feedstock which comprises: cooling a gaseous mixture containing helium, carbon dioxide, nitrogen, and methane to separate a first liquid fraction containing dissolved helium and a first helium enriched gaseous fraction, stripping helium from said first liquid fraction into an overhead gaseous fraction, cooling said overhead gaseous fraction and said first gaseous fraction to separate a second liquid fraction containing dissolved helium and a second helium enriched gaseous fraction, passing said second liquid fraction to a fractionation zone maintained under conditions to recover helium from the second liquid fraction, cooling said second gaseous fraction to separate helium-rich gaseous material from methane enriched liquid under conditions to avoid carbon dioxide precipitation, and passing at least a portion of said methane enriched liquid to said fractionation zone to provide reflux therein.

2. The method of claim 1 in which said first liquid fraction is stripped over a temperature range from about −125° F. to about −175° F.

3. The method of claim 1 in which said fractionation zone comprises a stripping and a rectifier section, the rectifier top temperature being maintained between about −200° F. and about −320° F.

4. The method of claim 1 in which said stripping and fractionation is carried out within a pressure range between about 400 and about 650 p.s.i.a.

5. The method of claim 1 in which said second gaseous fraction is cooled and separated in a plurality of stages of successively lower temperature in the direction of flow to avoid carbon dioxide precipitation.

6. A method for recovering helium from a natural gas feedstock which comprises: cooling a gaseous mixture containing helium, carbon dioxide, nitrogen, and methane from which relatively heavy hydrocarbon constituents of the natural gas feedstock have been removed to separate a first liquid fraction containing dissolved helium and a first helium enriched gaseous fraction, stripping helium from said first liquid fraction into an overhead gaseous fraction, cooling said overhead gaseous fraction and said first gaseous fraction to separate a second liquid fraction containing dissolved helium and a second helium enriched gaseous fraction, passing said second liquid fraction to a fractionation zone maintained under conditions to recover helium from the second liquid fraction into a fractionation overhead stream, cooling said second gaseous fraction and said fractionation overhead stream to separate a helium-rich gaseous material from methane enriched liquid under conditions to avoid carbon dioxide precipitation, and passing at least a portion of said methane enriched liquid to said fractionation zone to provide reflux therein.

7. A method for recovering helium from a natural gas feedstock which comprises: cooling a mixture containing helium, carbon dioxide, nitrogen, and methane from which relatively heavy hydrocarbon constituents of the natural gas feedstock have been removed to separate a first liquid fraction containing dissolved helium and a first helium enriched gaseous fraction, stripping helium from said first liquid fraction into an overhead gaseous fraction, cooling said overhead gaseous fraction and said first gaseous fraction to separate a second liquid fraction containing dissolved helium and a second helium enriched gaseous fraction, passing said second liquid fraction to a fractionation zone comprising a rectifier section maintained at a rectifier top temperature between about −200° F. and about −320° F. and a stripping section maintained under conditions to recover substantially all of the helium content of the liquid fraction into a fractionation overhead stream, cooling said second gaseous fraction to a suitable temperature for the separation of a helium enriched third gaseous fraction from a third liquid fraction enriched in methane under conditions to avoid carbon dioxide precipitation, passing said third liquid to said rectifier section of the fractionation zone, cooling said third gaseous fraction and said fractionation overhead stream to a suitable temperature for the separation of a helium-rich gaseous product from a fourth liquid fraction enriched in methane, and passing said fourth liquid fraction into said rectifier to provide reflux therein.

8. A method for recovering helium from a natural gas feedstock which comprises: cooling a mixture containing helium, carbon dioxide, nitrogen, and methane from which relatively heavy hydrocarbon constituents of the natural gas feedstock have been removed to separate a first liquid fraction containing dissolved helium and a first helium enriched gaseous fraction, stripping helium from said first liquid fraction into an overhead gaseous fraction in a stripping zone maintained between about $-125°$ F. and about $-175°$ F., cooling said overhead gaseous fraction and said first gaseous fraction to separate a second liquid fraction containing dissolved helium and a second helium enriched gaseous fraction, passing said second liquid fraction to a fractionation zone comprising a rectifier section maintained at a rectifier top temperature between about $-200°$ F. and about $-320°$ F. and a stripping section maintained under conditions to recover substantially all of the helium content of the liquid fraction into a fractionation overhead stream, cooling said second gaseous fraction to between about $-200°$ F. and about $-250°$ F. for the separation of a helium enriched third gaseous fraction from a third liquid fraction enriched in methane, passing said third liquid to said rectifier section of the fractionation zone, cooling said third gaseous fraction and said fractionation overhead stream to between about $-250°$ F. and about $-320°$ F. for the separation of a helium-rich gaseous product from a fourth liquid fraction enriched in methane, and passing said fourth liquid fraction into said rectifier to provide reflux therein.

9. The method of claim 8 in which said reflux is enriched in methane by the introduction of methane to the process from an extrinsic source.

10. A method for recovering helium from a natural gas feedstock which comprises: cooling a mixture containing helium, carbon dioxide, nitrogen, and methane from which relatively heavy hydrocarbon constituents of the natural gas feedstock have been removed to separate a first liquid fraction containing dissolved helium and substantially all of the carbon dioxide contained in the mixture and a first helium enriched gaseous fraction, passing said first liquid fraction to a fractionation zone maintained under conditions to recover helium from the liquid fraction, by-passing said first gaseous fraction around said fractionation zone and cooling said first gaseous fraction to separate helium-rich gaseous material from methane enriched liquid under conditions to avoid carbon dioxide precipitation, and passing at least a portion of said methane enriched liquid to said fractionation zone to provide reflux therein.

11. The method of claim 10 in which said fractionation zone comprises a stripping and a rectifier section, the rectifier top temperature being maintained between about $-130°$ F. and about $-320°$ F.

12. The method of claim 11 in which said rectifier top temperature is maintained between about $-130°$ F. and about $-240°$ F.

13. A method for recovering helium from a natural gas feedstock which comprises: cooling a mixture containing helium, carbon dioxide, nitrogen, and methane from which relatively heavy hydrocarbon constituents of the natural gas feedstock have been removed to separate a first liquid fraction containing dissolved helium and substantially all of the carbon dioxide contained in the mixture and a first helium enriched gaseous fraction, passing said first liquid fraction to a fractionation zone maintained under conditions to recover substantially all of the helium content of the liquid fraction into a fractionation overhead stream, by-passing said first gaseous fraction around said fractionation zone and cooling said first gaseous fraction and said fractionation overhead stream to separate helium-rich gaseous material from methane enriched liquid under conditions to avoid carbon dioxide precipitation, and passing said methane enriched liquid to said fractionation zone to provde reflux therein.

14. A method for recovering helium from a natural gas feedstock which comprises: cooling a mixture containing helium, carbon dioxide, nitrogen, and methane from which relatively heavy hydrocarbon constituents of the natural gas feedstock have been removed to separate a first liquid fraction containing dissolved helium and a first helium enriched gaseous fraction, passing said first liquid fraction to a fractionation zone maintained under conditions to recover helium from the liquid fraction into a fractionation overhead stream, cooling said first gaseous fraction to a suitable temperature for the separation of a helium enriched second gaseous fraction from a second liquid fraction enriched in methane under conditions to avoid carbon dioxide precipitation, passing said second liquid to said rectifier section of the fractionation zone, further cooling said second gaseous fraction and said fractionation overhead stream to a suitable temperature for the separation of a helium-rich gaseous product from a third liquid fraction enriched in methane without carbon dioxide precipitation, and passing said third liquid fraction into said fractionation zone to provide reflux therein.

15. A method for stripping helium from a liquid mixture containing essentially nitrogen, methane, and dissolved helium in a stripping tower containing a plurality of sections of suitable tower packing material arranged in the path of flow of liquid and vapor material through the tower which comprises: passing such a liquid mixture downwardly over the tower packing material toward the bottom of the stripping tower in intimate countercurrent contact with upflowing vapor produced by reboiling a portion of such liquid within a bottom portion of the tower under conditions suitable for stripping a substantial percentage of the dissolved helium from the liquid and such that the density of the vapor rising in the tower increases to a maximum within an intermediate portion of the tower packing due to the increasing relative concentration of nitrogen with respect to methane thereby creating a density differential pressure driving force tending to cause reverse flow of vapor in the tower, passing such vapor upwardly in serial flow through a first packed section, a vapor distribution zone in which there is a substantial reduction in pressure, the vapor distribution zone being at or slightly below the point in the tower at which the total downward driving force on the upflowing vapor, consisting of the liquid head and the density differential downward driving force, would overcome the upward driving force of the upflowing vapors produced by reboiling if no vapor distribution zone were used, and a second packed section, the pressure drop caused by passing said vapor through said vapor distribution zone being sufficient to compensate for the density differential pressure driving force, and withdrawing helium-containing vapor overhead of said tower.

16. A method for stripping helium from a liquid mixture containing essentially nitrogen, methane and dissolved helium in a stripping tower containing a plurality of sections of suitable tower packing material arranged in the path of flow of liquid and vapor material through the tower which comprises: passing such a liquid mixture downwardly over the tower packing material toward the bottom of the stripping tower in intimate countercurrent contact with upflowing vapor under conditions suitable for stripping a substantial percentage of the dissolved helium from the liquid and such that the density of the vapor rising in the tower increases due to the increasing relative concentration of nitrogen with respect to methane thereby creating a density differential pressure driving force tending to cause reverse flow of vapor in the tower, passing such vapor upwardly in serial flow through a first packed section, a vapor distribution zone in which there is a substantial reduction in pressure, the vapor distribution zone being at or slightly below the point in the tower at which the total downward driving force on the upflowing vapor, consisting of the liquid head and the density differential downward driving force, would overcome the upward driving force of the upflowing vapors if no vapor distribution zone were used, and a second packed section, the pressure drop caused by passing said vapor through said vapor distribution zone being substantially sufficient to compensate for the density differential pressure driving force, and withdrawing helium-containing vapor overhead of said tower.

References Cited

UNITED STATES PATENTS

| | | | |
|---|---|---|---|
| 1,204,521 | 11/1916 | Van Fleet | 62—42 |
| 1,850,529 | 3/1932 | Bottoms | 62—27 |
| 3,205,669 | 9/1965 | Grossmann | 62—23 |
| 3,260,058 | 7/1966 | Ray et al. | 62—23 |
| 3,282,060 | 11/1966 | Hays | 62—24 |

FOREIGN PATENTS 535,121  2/1955  Belgium.

NORMAN YUDKOFF, *Primary Examiner.*

V. W. PRETKA, *Assistant Examiner.*